United States Patent [19]

Lavene

[11] Patent Number: 4,516,187
[45] Date of Patent: May 7, 1985

[54] OUTER WRAPPING AND PLANAR TERMINATIONS FOR A METALLIZED WOUND CAPACITOR AND METHOD THEREFOR

[75] Inventor: Bernard Lavene, Ocean, N.J.

[73] Assignee: Electronic Concepts, Inc., Eatontown, N.J.

[21] Appl. No.: 513,271

[22] Filed: Jul. 13, 1983

[51] Int. Cl.³ .......................... H01G 4/18; H01G 1/14
[52] U.S. Cl. ................................... 361/309; 29/25.42; 361/323
[58] Field of Search ....................... 29/25.42; 206/328; 361/272, 316, 306, 323, 308, 309, 310

[56] References Cited

U.S. PATENT DOCUMENTS

| | | | |
|---|---|---|---|
| 1,938,806 | 12/1933 | Butler | 361/272 |
| 2,549,770 | 4/1951 | Burnham | 361/316 |
| 3,327,184 | 6/1967 | Valley | 361/309 |
| 3,385,922 | 5/1968 | Rice | 206/328 X |
| 3,435,308 | 3/1969 | Fanning | 361/306 X |
| 3,612,963 | 10/1971 | Piper et al. | 361/309 X |
| 3,654,532 | 4/1972 | Rayburn | 361/309 X |
| 4,170,812 | 10/1979 | Rayno | 29/25.42 |
| 4,240,127 | 12/1980 | Fanning et al. | 361/304 |
| 4,267,565 | 5/1981 | Puppolo et al. | 361/433 |
| 4,352,145 | 9/1982 | Stockman | 361/329 |
| 4,363,162 | 12/1982 | Price | 29/25.42 |
| 4,378,620 | 4/1983 | Lavene | 361/323 X |

Primary Examiner—Donald A. Griffin
Attorney, Agent, or Firm—Ratner & Prestia

[57] ABSTRACT

A wound capacitor and method therefor having metallized elongated dielectric webs. An additional dielectric web is wound about the capacitor roll and forms a protective wrap. The additional web has a pair of metallic band terminals formed on the side of the additional web remote from the capacitor roll with each band disposed adjacent a respective end of the capacitor roll. Terminals are bonded to each end of the capacitor with each terminal contacting a respective metallized electrode and an adjacent metallic bond. An additional dielectric web having a plurality of metallic bands is also wound about a capacitor roll of electrodes formed in staggered and overlapping arrangement relative to each other. The capacitor roll is then chopped to form substantially small sized capacitors each having a protective wrap with a pair of metallic band terminals.

10 Claims, 9 Drawing Figures

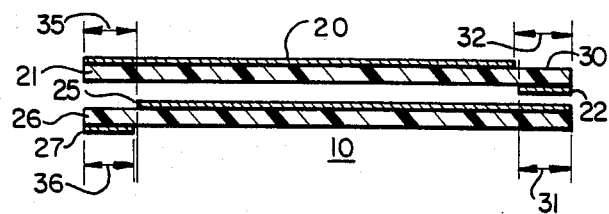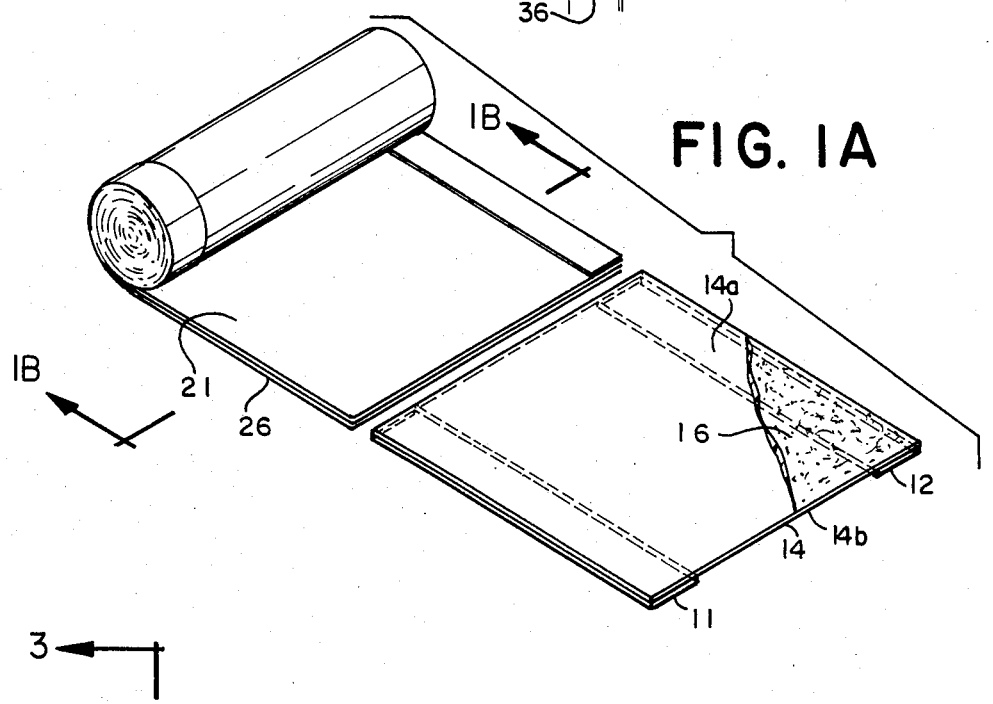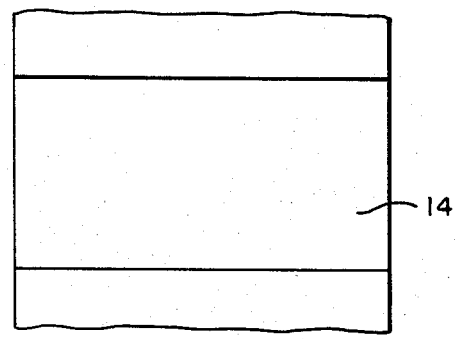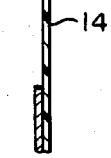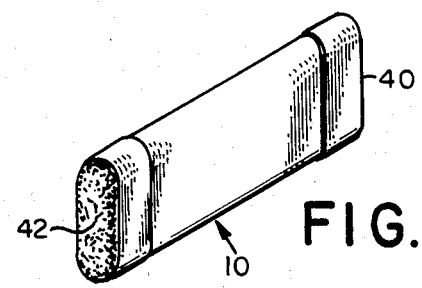

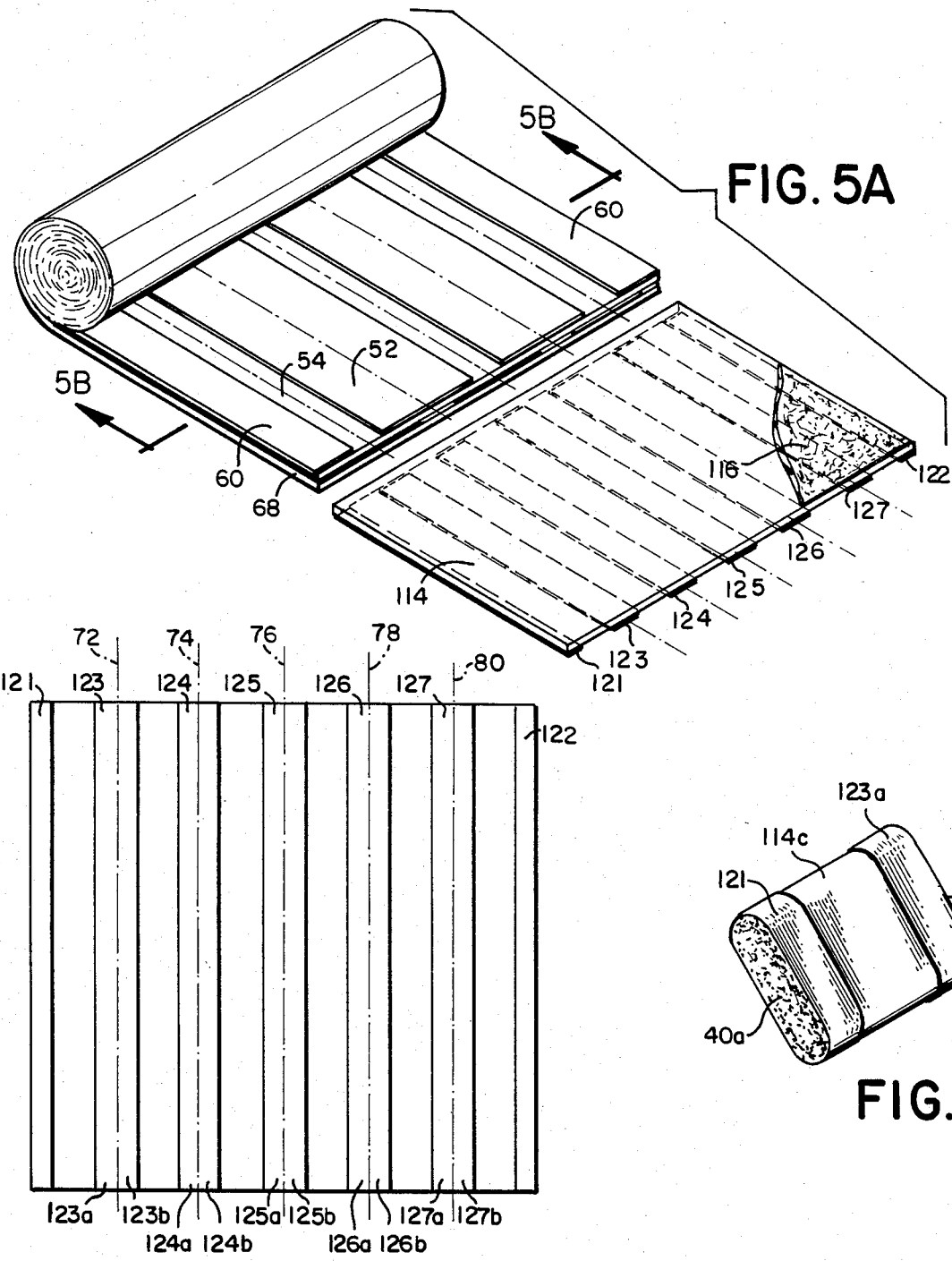

OUTER WRAPPING AND PLANAR TERMINATIONS FOR A METALLIZED WOUND CAPACITOR AND METHOD THEREFOR

BACKGROUND OF THE INVENTION

1. Field of the Invention

This invention relates to metallized dielectric wound capacitors, and more particularly to an outer wrap for a wound capacitor.

2. Background Art

It has been known that direct mounting of electrical components such as metallized wound capacitors, is particularly useful in thin and thick integrated hybrid circuitry. Connections to a circuit board have been made by using reflow soldering or similar means. Accordingly, the component has been required to have planar external terminal leads in order to provide a multiplicity of such components on a board to achieve the desired package density and compatability of other components. Previous wound capacitors have left much to be desired as a result of their relatively high costs and their protruding terminal leads. In fact, even after the capacitor has been connected, in many applications it could not withstand severe environmental requirements such as for military purposes.

Accordingly, an object of the present invention is a metallized dielectric wound capacitor having a protective and sealing outer wrap which also provides planar terminal connections on the outer end surface of the capacitor.

Capacitors having various forms of metallized connections are described in the following U.S. Pat. Nos. 3,435,308; 4,170,812; 4,240,127; 4,352,145; 4,267,565; 4,363,162.

SUMMARY OF THE INVENTION

A metallized wound capacitor and method therefor in which first and second elongated dielectric webs have at least one electrode formed on at least one face. The dielectric webs are convolutely arranged in a capacitor roll with the electrodes in superposed relation to each other. A third dielectric web is wound about the capacitor roll to form a protective wrap. The third web has a first and a second metallic band formed on the side of the third web remote from the capacitor roll and each band is disposed adjacent a respective end of the roll.

BRIEF DESCRIPTION OF THE DRAWINGS

FIG. 1A is a diagrammatic view illustrating one embodiment of the invention for providing an outer wrapping and planar terminations for a wound capacitor;

FIG. 1B is a cross-section of two webs along line 1B of FIG. 1A;

FIG. 2 is a bottom view of the protective wrap web of FIG. 1A;

FIG. 3 is a cross-section of the web of FIG. 2 taken along line 3—3;

FIG. 4 is a perspective view of the finished capacitor of FIG. 1A;

FIG. 5A is a diagrammatic view illustrating another embodiment of the invention;

FIG. 5B is a cross-section of two webs along line 5B of FIG. 5A;

FIG. 6 is a bottom view of the protective wrap web of FIG. 5A; and

FIG. 7 is a perspective view of the chopped and finished capacitor of FIG. 5A.

DETAILED DESCRIPTION OF THE INVENTION

Referring now to FIGS. 1A-B, a capacitor 10 is shown comprising a first elongated dielectric web 21 having an electrode 20 metallized on an upper face thereof. A second elongated dielectric web 26 is aligned with and is of the same width as web 21 and also has an electrode 25 metallized on an upper face thereof. Electrodes 20,25 are of less width than that of web 21,26 and extend from one longitudinal edge thereof leaving respective safe edges or bare margins 30,34 of the web along opposite edges thereof. Specifically, electrode 20 extends from the left edge of web 21 and electrode 25 extends from the right edge of web 26.

Dielectric web 21 is dual metallized by means of a second substantially thin width electrode 22 metallized on its lower face only directly below margin 30. Electrode 22 extends from the right longitudinal edge of web 21, which is opposite to that edge to which electrode 20 extends. Similarly, dielectric web 26 has a second electrode 27 metallized on a lower face thereof only directly below bare margin 34. Layer 27 extends from the left longitudinal edge remote to that edge from which electrode 25 extends. The foregoing construction of metallizations 20, 22, 25 and 27 are described in detail in applicant's copending application Ser. No. 459,794 filed Jan. 21, 1983, which is incorporated herein by reference. Specifically, electrode 22 is of width 31 which is equal to width 32 less the manufacturing tolerance. Similarly, electrode 27 is of width 36 which is equal to width 35 less the manufacturing tolerance. Thus, no portion of layer 22 is formed under electrode 20, and substantially no portion of the area of electrode 27 extends below electrode 25.

Metallized webs 21,26 are disposed in superposed relation to each other with bare margins 30,34 respectively disposed at opposite edges of the superposed webs. The webs are then wound in conventional manner. On completion of the winding of the metallized webs into a capacitor roll, electrodes 22,25 engage and act as an effective single conductor to provide twice the surface area of the metal spray. Similarly, on rolling, electrodes 20,27 provide twice the effective surface area.

In accordance with the invention as best shown in FIG. 1A, as the winding is being completed, a short length of clear outer wrap web 14 is provided having the same width as webs 21,26. The longitudinal edges of web 14 are aligned with corresponding longitudinal edges of webs 21,26 and the trailing transverse edge 15 of webs 21,26 is slightly ahead of starting transverse edge 15a of web 14. Web 14 has two metallic band 11 and 12 of uniform width extending parallel to each other longitudinally of web 14 and metallized on a lower face 14b thereof throughout substantially the entire length of wrap 14. As shown in FIGS. 2,3 metallized bands or terminals 11,12 each extend from respective longitudinal edges and each have a width which is preferably about 25% of the width of web 14. Thus, preferably terminals 11,12 are separated from each other by a bare strip up to about 50% of the width of web 14. In absolute dimension each terminal preferably has a width between 1/64" to ⅛". Thus, terminal 11 extends from the left edge of web 14 while terminal 12 extends from the right edge of web 14. In conventional manner, upper face 14a of web 14 has an adhesive melt 16 formed thereon. Web 14 is preferably about 1 mil thick and of sufficient length so that after it is wound around the outer layer of web 26 and capacitor 10 is tempered, it forms several wraps or plies and is of sufficient strength to protect and close capacitor 10. Web 14 is a thin plastic film constructed of a dielectric material preferably polyetherimide (ULTEMP) and may also be polysulfone, polyester or polycarbonate.

In the winding operation, web 14 must be wound carefully so that its starting edge 15a starts winding slightly after end 15 of webs 21,26. In this manner, as an integral part of the winding operation, web 14 is wound around the outer electrode layer of the capacitor with metallized terminals 11,12 not contacting electrodes 20, 22, 25 and 27. Accordingly, there is formed a tube defined by web 14 and the metallized outer terminals form rings 11,12 which are not connected to the capacitor electrodes at this time.

On completion of the winding of capacitor roll or coil 10 surrounded by web 14, the capacitor coil is first flattened in conventional manner and then heated to temper dielectric webs 21,26 and to melt adhesive 16 thereby to form web 14 into a protective flattened sleeve. Thereafter, the ends of capacitor 10, may be sprayed with a high velocity mixture of compressed air and molten fine particles of metal produced from an electric arc gun. This spray forms terminal 40 in contact with electrodes 22 and 25 as well as with right terminal 12. Further, the spray forms terminal 42 which is in contact with electrodes 27,20 as well as with left terminal 11.

It will now be understood by those skilled in the art that web 14 forms a protective outer wrap which seals and closes the winding of webs 21,26 and thereby prevents the webs from unraveling. In addition, the metallized terminals 11,12 form outer flattened band terminals or end cap terminals which are electrically connected to the respective electrodes by way of spray terminals 40,42. Thus, capacitor 10 may be used in reflow soldering applications, for example, where the side of the capacitor is to contact the circuit board.

Referring now to FIGS. 5A–B, 6 there is shown a further embodiment of the invention in which an outer wrap web 114 is provided for a capacitor coil 10a formed of a plurality of concentric longitudinally split electrodes disposed between dielectric webs in insulated and overlapping relation to one another. Individual small-sized chip capacitors 70, FIG. 7 are formed by chopping the coil as disclosed in applicant's U.S. Pat. No. 4,378,620, which is incorporated herein by reference.

Capacitor coil 10a coprises a mated pair of dielectric webs 50,68 with each web having a multiplicity of thin parallel metallic electrodes 52,55 respectively deposited on one side thereof and running along the length of the webs. The electrodes are separated by a set of parallel open spaces 54. The arrangement is such that outermost electrodes 60 lie along the edges of the first web 50 and on the second web 68 there are open unplated areas 62 along the corresponding edges. The electrodes are arranged across the width of the webs so that the electrode space pattern on one is in a staggered and overlapping arrangement relative to that in the other so that substantially the central portion of a plated area on one of the webs is more or less over the center line of the open spaces directly above or below it.

As previously described with respect to FIG. 1A, as the winding of the coil is being completed, a short length of clear outer wrap web 114 is provided having the same width as webs 50,68. The longitudinal edges of web 114 are aligned with the corresponding longitudinal edges of webs 50,68. The trailing transverse edge 115 of webs 50,68 is slightly ahead of starting transverse edge 115a of web 115. In conventional manner, upper face 114a of web 114 has an adhesive melt 116 formed thereon. Web 114 is of sufficient length so that after it is wound around capacitor 30a and the capacitor is tempered, it forms several plies.

Web 114 has parallel electrodes or terminals 121–127 metallized on a lower face 114b thereof throughout substantially the entire length of wrap 114. More specifically, outer terminals 121,122 lie along the eges of web 114 and are adapted to form terminals for electrodes 60. Metallized terminal 123 is longitudinally bisected by center line 72 defining terminal pair 123a,b which form terminals for electrode 55 in the manner later to be described. Similarly, metallized terminal 114 is bisected by center line 74 defining metallized terminal pair 124a,b which form terminals for electrode 52, etc. In each of the resultant chip capacitors that are formed by chopping coil 10a, it will be understood that each of the outer terminals e.g., each of terminals 121,123a has a width which is preferably about twenty-five percent of the width between ends of the respective chip capacitor.

In the winding operation, web 114 is required to be wound carefully so that its starting edge 115a starts winding slightly after edge 115. In this manner, as an integral part of the winding operation, web 114 is wound around the outer electrode layer of the capacitor coil with the metallized electrodes not contacting terminals 121–127. Accordingly, there is formed a protective outer wrap with terminals 121–127 not connected to the capacitor electrodes at this time.

On completion of the capacitor roll surrounded by web 114, the capacitor coil is flattened in conventional manner and then heated to temper dielectric webs 50,68 and to melt adhesive 116 thereby to form web 114 into a protective oval sleeve.

As described in U.S. Pat. No. 4,378,620, the staggered arrangement formed by capacitor coil 10a provides horizontal series of individual parallel plate capacitors 70 aligned next to each other along the coil and within the outer wrap 114. These capacitors are separated from each other by chopping the finished coil vertically along lines 72, 74, 76, 78, 80 to provide a clear cut through the web 114 and alternating open spaces and electrodes in webs 50,68. At the completion of the operation, there are formed a plurality of substantially small flattened rectangular shaped chip capacitors 70 shown in FIG. 7, each of which has an outer wrap protecting a series of concentric conductive elements with terminal bands formed adjacent both capacitor ends.

As shown in FIG. 7, chip capacitor 70 is protected by outerwrap section 114c and thereafter the ends of capacitor 70 may be sprayed with a high velocity mixture of compressed air and molten fine particles of metal. Specifically, as set forth in said patent, individual capacitors are lined up, in such a manner that the chopped ends form a composite assembly, and then sprayed. The spray forms terminal 40a in contact with electrode 55 as well as with terminal 123a. Further, the spray forms terminal 42a which is in contact with electrode 60 as well as with terminal 121.

It is in this manner that a section of web 114 forms a protective outer wrap or sleeve which seals and closes chip capacitor 70. In addition, the metallized band terminals 121, 123a form separate outer flattened end cap terminals which are electrically connected to the respective electrodes by way of spray terminals 42a, 40a. Chip capacitor 70 may be made of substantially the small size of ceramic capacitors such as 0.090×0.190×0.190 approximately.

The principles and objects of the invention having now been explained, it is to be understood that many modifications may be made within the spirit and scope of the invention. For example, instead of discrete capacitor 10 shown in FIG. 1B having dual metallization, a discrete capacitor may be used having metallization only on one side of webs 21,26.

What is claimed is:

1. A metallized wound capacitor comprising:
   first and second elongated dielectric webs each having at least one electrode formed on at least one face thereof, the dielectric webs being convolutely arranged in a capacitor roll with the electrodes in superposed relation to each other; and
   a third dielectric web wound about the capacitor roll to form a protective wrap, the third web having a first and a second metallic band terminal formed on the side of the third web remote from the capacitor roll and each band terminal disposed adjacent a respective end of the roll.

2. The metallized wound capacitor of claim 1 in which there is provided conductors formed on the ends of the capacitor roll each electrically connected to a respective electrode and the adjacent metallic band terminal thereby forming an end cap terminal for the capacitor.

3. The metallized wound capacitor of claim 2 in which said capacitor is flattened and heated to temper the dielectric webs whereby the third dielectric web forms an outer wrap which seals and closes the capacitor roll and the first and second metallic band terminals are flattened.

4. The metallized wound capacitor of claim 1 in which the first and second metallic bands each have a width which is approximately 25 percent of the total width of the third web.

5. A method of making wound capacitors which comprises the steps of:
   (a) winding a pair of elongated dielectric webs each having at least one electrode formed on at least one face thereof to form a cylindrical capacitor coil with the electrodes in superposed relation to each other;
   (b) applying to one side of an additional dielectric web a first and a second metallic ribbon extending substantially parallel to each other longitudinally of the additional web and extending from respective longitudinal edges; and
   (c) winding the additional web around the capacitor coil with metallic ribbons being remote from the capacitor/coil and with the starting transverse edge of the additional web following the trailing transverse edge of the pair of dielectric webs thereby to seal and close the capacitor coil and to form the metallic ribbons into metallic terminal bonds.

6. The method of claim 5 in which there is provided the additional steps of flattening and tempering the capacitor coil after step (c).

7. The method of claim 6 in which there is provided the further step of bonding conductors to the ends of the webs with each conductor electrically contacting a respective electrode and metallic terminal band.

8. The method of claim 7 in which step (c) includes winding the additional web to form at least two plies.

9. A method of making substantially small sized wound capacitors which comprises the steps of:
   (a) applying a plurality of continuous spaced metallic electrodes on one side of each of a pair of dielectric webs;
   (b) mating the pair of webs with the electrodes in each web being in a staggered and overlapping arrangement relative to each other;
   (c) winding the mated webs to form a cylindrical layered capacitor coil defining an alternating arrangement of continuous electrodes spaced from layer to layer;
   (d) applying to one side of an additional dielectric web a plurality of metallic ribbons longitudinally of the additional web;
   (e) winding the additional web around the capacitor coil with the metallic ribbons being superposed with associated metallic electrodes; and
   (f) chopping the additional web and capacitor coil through the alternating open spaces and electrodes and metallic ribbons to form individual capacitors of wound continuous electrodes having a protective wrap with a pair of outer metallic terminal bands.

10. The method of claim 9 in which there is provided the further step of bonding conductors to the chopped ends of the individual capacitors each to electrically contact a respective electrode and a terminal band.

* * * * *